(12) United States Patent
Wald et al.

(10) Patent No.: US 12,269,572 B2
(45) Date of Patent: Apr. 8, 2025

(54) CONNECTOR FOR A STRUCTURALLY INTEGRATED LINE SYSTEM

(71) Applicant: Airbus Defence and Space GmbH, Taufkirchen (DE)

(72) Inventors: Sascha Wald, Taufkirchen (DE); Sebastian Peters, Taufkirchen (DE); Michael Rappitsch, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 510 days.

(21) Appl. No.: 17/579,698

(22) Filed: Jan. 20, 2022

(65) Prior Publication Data

US 2022/0234760 A1 Jul. 28, 2022

(30) Foreign Application Priority Data

Jan. 22, 2021 (DE) .................. 10 2021 101 438.7

(51) Int. Cl.
*B64C 1/06* (2006.01)
*F16L 27/12* (2006.01)
*B64D 13/00* (2006.01)

(52) U.S. Cl.
CPC ................ *B64C 1/06* (2013.01); *B64C 1/064* (2013.01); *F16L 27/12* (2013.01); *B64D 13/00* (2013.01)

(58) Field of Classification Search
CPC ... F16L 23/02; F16L 41/18; F16L 3/18; F16L 3/22
See application file for complete search history.

(56) References Cited

U.S. PATENT DOCUMENTS

| 3,345,022 A * | 10/1967 | Jorgensen | F16L 3/22 174/491 |
| 6,565,048 B1 * | 5/2003 | Meyer | F16L 3/22 248/58 |
| 9,010,689 B1 * | 4/2015 | Brook | F16L 41/18 244/135 R |
| 2012/0241560 A1 * | 9/2012 | Erickson | F16L 3/22 285/285.1 |

(Continued)

FOREIGN PATENT DOCUMENTS

DE 10 2006 012 410 A1 9/2007
DE 10 2011 002 492 A1 7/2012

(Continued)

OTHER PUBLICATIONS

German Search Report for Application No. 102021101437 dated Sep. 14, 2021.

(Continued)

*Primary Examiner* — Matthew Troutman
*Assistant Examiner* — Fannie Kee
(74) *Attorney, Agent, or Firm* — KDW Firm PLLC

(57) ABSTRACT

A connector for a structurally integrated line system of a vehicle, having a first end portion, a second end portion and a connecting piece extending between the first end portion and the second end portion, wherein the first end portion has at least one contact face for arrangement on a structurally integrated line, wherein at least one of the at least one contact face has a cutout which is surrounded by a closed border, wherein the second end portion has a flange connection for connection to a pipe.

13 Claims, 6 Drawing Sheets

(56) References Cited

U.S. PATENT DOCUMENTS

| | | | |
|---|---|---|---|
| 2013/0316147 A1* | 11/2013 | Douglas | F16L 3/22 156/60 |
| 2014/0284426 A1* | 9/2014 | Erickson | F16L 41/18 244/135 R |
| 2015/0336656 A1 | 11/2015 | Rolfes | |
| 2016/0052617 A1* | 2/2016 | Rolfes | F16L 41/18 244/119 |
| 2018/0231041 A1* | 8/2018 | Gallien | F16L 23/02 |

FOREIGN PATENT DOCUMENTS

| | | |
|---|---|---|
| DE | 10 2016 011 983 A1 | 4/2018 |
| EP | 2 607 765 A1 | 6/2013 |
| EP | 2 987 720 A1 | 2/2016 |
| EP | 3 587 249 A1 | 1/2020 |
| GB | 2575280 A * | 1/2020 .............. F16L 41/18 |

OTHER PUBLICATIONS

European Search Report for U.S. Appl. No. 22/150,674 dated May 11, 2022.

* cited by examiner

CONNECTOR FOR A STRUCTURALLY INTEGRATED LINE SYSTEM

CROSS-REFERENCE TO RELATED APPLICATION

This application claims priority to German Patent Application No. 10 2021 101 438.7 filed Jan. 22, 2021, the entire disclosure of which is incorporated by reference herein.

TECHNICAL FIELD

The disclosure herein relates to a connector for a structurally integrated line system of a vehicle, to a structurally integrated line system of a vehicle, and to a vehicle having at least one structurally integrated line system.

BACKGROUND

It is known to equip vehicle structures, for example fuselage or wing structures of aircraft, with a certain degree of multifunctionality in order to reduce weight. An example thereof is the integration of a fluid line in the form of a cavity extending in the structure. This could be situated in a reinforcing component, for example a stringer, and extend from one end of a fuselage component to another end.

SUMMARY

It would be desirable to increase such multifunctionality without thereby affecting the underlying configuration of the vehicle component and reinforcing components or the like attached thereto. The establishment, for example, of a network of lines with multiple structurally integrated fluid lines connected to one another can make a contribution in this respect.

Accordingly, it is an object of the subject matter herein to disclose a structurally integrated line system in which longer line lengths, branches, junctions and other network features are possible, wherein at the same time the underlying configuration of structural components therefor does not have to be changed and moreover structural loads, structural deformations, system loads, production deviations and thermal expansion between individual structural components are nevertheless possible.

The object is achieved by a connector for a structurally integrated line system having features disclosed herein. Advantageous embodiments and further developments are disclosed herein.

A connector for a structurally integrated line system of a vehicle is proposed, having a first end portion, a second end portion and a connecting piece extending between the first end portion and the second end portion, wherein the first end portion has at least one contact face for arrangement on a structurally integrated line, wherein at least one of the at least one contact face has a cutout which is surrounded by a closed border, wherein the second end portion has a flange connection for connection to a pipe.

The connector permits the connection of a single, isolated, structurally integrated line in order to connect it to another line, which can likewise be a structurally integrated line. Multiple structurally integrated lines can together form a line system by using in each case a connector according to the disclosure herein. To this end, they are each coupled with a connector according to the disclosure herein, wherein the two connectors are connected together via a suitable pipe or the like. To this end, the connector has a shape adapted to the structurally integrated line.

The first end portion has one or more contact faces for connection to the structurally integrated line. At least one of the contact faces has a cutout which is surrounded by a border. The border could delimit the contact face and extends around the periphery of the cutout. The contact face in question is adapted to an outer boundary surface of the structurally integrated line in question. It is thereby preferred that the contact face facing the outer boundary surface is configured so as to be complementary to the outer boundary surface, such that it can be applied substantially flush thereto. For connection to the outer boundary surface, the contact face in question is adhesively bonded, screwed, welded or otherwise connected to the outer boundary surface. In order to produce a fluidic connection with an interior of the structurally integrated line, the outer boundary surface has an opening, which is covered by the cutout. It can thereby be preferred that the opening in the outer boundary surface is smaller than the cutout that covers it, so that the border surrounding the cutout is able to lie flush against the outer boundary surface without any gaps and can be used for sealing.

The second end portion can be configured for connection to a pipe or other fluid-conducting component. It can be expedient to provide here a flange which is compatible with flanges of generic fluid lines, for example for air. By the connecting piece, the flange connection is spaced apart from the first end portion and can consequently achieve a certain mechanical compensation between the position of the first end portion and of the second end portion. Particularly preferably, the connecting piece is at least partially resilient or variable in terms of its position or length, in order purposively to provide position and length compensation. By such a resilient configuration with variable length or variable position, the exchange of components, for example sealing rings, in the installed state could be made possible.

Overall, the connector according to the disclosure herein makes it possible to produce a system of structurally integrated lines which are connected to one another in which no adjustments to the structurally integrated lines are required and a stress-free construction is nevertheless achieved. Deformations are compensated for in such a manner that no stresses occur in the components. The structurally integrated lines undertake the multifunctional task of fluid transport and of load transfer.

In an advantageous embodiment, the first end portion has a first contact face in which the cutout is arranged, wherein the first end portion has a second contact face which protrudes at an angle to the first contact face. The structurally integrated line can have an above-mentioned opening, which extends through a lateral surface of its cross-section through which flow takes place and is covered by the first contact face. The two contact faces are complementary to the lateral surface and can both be applied flush to the lateral surface. By the opening and the cutout, a fluidic connection between the structurally integrated line and the connector is produced. Owing to the arrangement of the two contact faces at an angle to one another, the first end portion can be placed on an edge of the lateral surface of the structurally integrated line. It is thereby to be assumed that the lateral surface likewise has at least two surface portions which are at an angle to one another and enclose an edge.

Furthermore, the second contact face could be free of a cutout. The second contact face is consequently configured merely to be brought into surface contact with the lateral surface. By the contact of two contact faces with the structurally integrated line, load transfer in two planes, which are defined by the contact faces, is made possible. A second contact face is expedient in order to connect the connector to the structurally integrated line with sufficient tightness and strength. The connector per se is not to transfer any loads or scarcely any loads but, owing to the structurally integrated lines, will follow deformations.

In an advantageous embodiment, the cutout is rectangular. Maximum coverage of an opening arranged in the lateral surface of the flow-integrated line can thereby be achieved. The cutout could further be surrounded by a border which is likewise rectangular at its outer periphery. Particularly preferably, the border has a uniform local width. Moreover, it does not have any gaps, in order to achieve seal face pairing. The cutout could have the same cross-sectional area as that of the structurally integrated line.

It is particularly advantageous if the first end portion has multiple contact faces which form a trapezoidal shape relative to one another. The trapezoidal shape of the structurally integrated line has been found to be advantageous for certain applications and production methods, as described, for example, in EP 3 587 249 A. Consequently, it is expedient that the connector is likewise trapezoidal, in order to adapt to the trapezoidal shape and have planar bearing faces. It is conceivable that a longer base of the trapezoidal cross-section of the line is arranged flush on a structural component, while the legs and the shorter base protrude from the structural component. The trapezoidal contour of the contact faces is so configured that the contact faces can be placed from outside on a structurally integrated line having such a shape. A structurally integrated line with a trapezoidal cross-section is significantly simpler to produce than with a circular cross-section and has already proved itself as a reinforcing profile.

In an advantageous embodiment, the connecting piece adjoins the cutout at an angle to a plane spanned by the cutout. The connecting piece could, for example, extend perpendicularly to the plane in question and consequently perpendicularly to the direction of flow in the structurally integrated line. It is, however, also conceivable to adapt the extension of the connecting piece, in particular at an inlet, but also at an outlet, to the direction of flow. Consequently, a departure angle of the connector can here be varied in order to be able to adapt the construction to the application. The extension of the connecting piece could enclose an angle of, for example, from 30° to 60° with the direction of flow. As a result, lower flow losses overall, adapted to specific applications, can be achieved.

The connecting piece is particularly preferably configured to establish between the first end portion and the second end portion a stepless transition from a flow cross-section adapted to the structurally integrated line to an at least largely circular cross-section. The flow resistance caused by the connector can thus be reduced and preferably minimized.

In a further advantageous embodiment, the flange connection has a circular flange. A transition between a cross-section that is adapted to the cutout and is thus preferably rectangular and a circular cross-section ending in the circular flange accordingly takes place between the first end portion and the second end portion. A circular connecting piece which has a cross-sectional area that is the same size as or larger than the cutout can be arranged at the flange connection. Conventional elements based on circular pipes can be connected thereto.

The connector particularly preferably has an assembly which is connected to the second end portion and has a sleeve and a pipe, which are inserted into one another so as to be longitudinally displaceable. A second connector which is connected by the flange connection to this assembly can be attached thereto. For connecting two structurally integrated lines, a combination of two connectors and such an assembly located between them is accordingly provided. It is thereby also possible that the two connectors are each coupled with a sleeve and a pipe is arranged between the two sleeves. The two connectors can each produce a fluidic connection with a structurally integrated line, while the mentioned assembly is used to connect the two structurally integrated lines together. By the longitudinally displaceable assembly, any component stresses and deformations which would additionally load the structure can be equalized and compensated for. In addition, the construction has a possibility for angle compensation, so that production and installation deviations can be accommodated.

The connecting piece is particularly preferably at least flexible. A pressure-tight and nevertheless flexible fluidic connection can thus be established. Numerous variants of a semi-flexible connection are conceivable, which could be based, for example, on a type of corrugated tube with braiding or a sheath.

The disclosure herein relates further to a structurally integrated line system having at least one structural component with at least one line integrated therein and at least one connector according to one of the preceding embodiments, wherein the at least one line has an opening on which the connector is arranged, so that the cutout covers the opening.

The line system can have at least two structurally integrated lines which are each connected to a connector, wherein an assembly having a sleeve and a pipe, which are inserted into one another so as to be longitudinally displaceable, extends between two connectors. As described hereinbefore, it is also possible for both connectors to be coupled with a sleeve, wherein a pipe which is displaceably inserted into the sleeves extends between the sleeves of two connectors.

The disclosure herein relates further to a vehicle having multiple structural components, wherein at least one structural component has at least one structurally integrated line which is connected to a connector according to the above description.

In an advantageous embodiment, the at least one structurally integrated line can have multiple structurally integrated lines which form an above-mentioned line system.

The vehicle could further have at least one system component which interacts with a fluid flowing in the structurally integrated line, wherein the at least one system component is connected directly to the flange connection.

Finally, the vehicle can be an aircraft, wherein at least one structurally integrated line is connected to an air source, for example a bleed air source or an external air source.

BRIEF DESCRIPTION OF THE DRAWINGS

Further features, advantages and possible applications of the disclosure herein will become apparent from the following description of the example embodiments and from the figures. All the features that are described and/or depicted in the figures form the subject-matter of the disclosure herein on their own and in any desired combination, regardless of their combination in the individual claims or their dependencies. Furthermore, identical reference signs in the figures denote identical or similar objects.

DETAILED DESCRIPTION

Figure 1A:
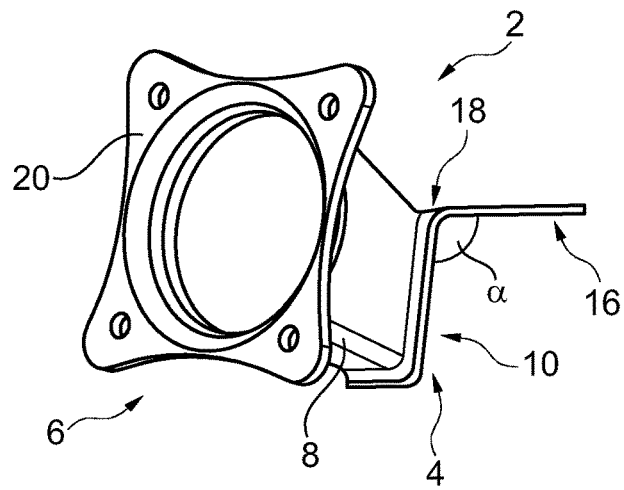
FIGS. 1A, 1B and 1C show a connector from multiple perspectives.
Figure 1B:
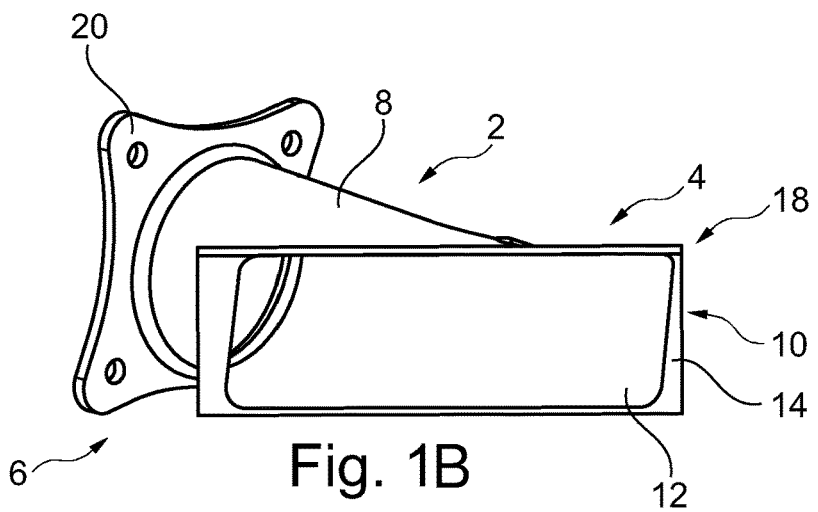
Figure 1C:
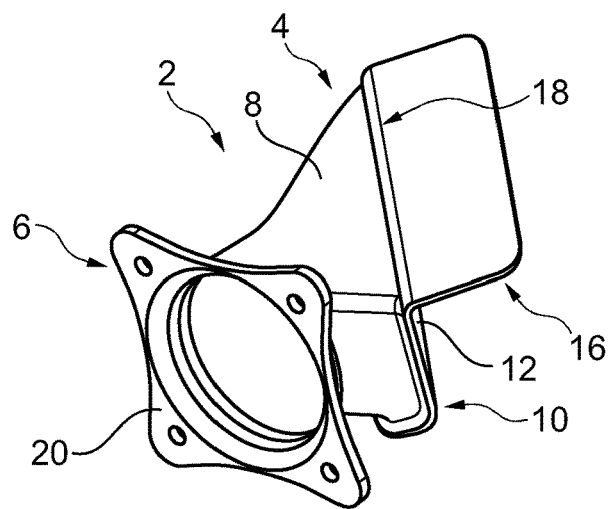

FIGS. 1A, 1B and 1C show different views of a connector 2 for a structurally integrated line system. In the following explanation, reference will be made to all three illustrations.

The connector 2 has a first end portion 4 and a second end portion 6. A connecting piece 8, which connects the two end portions 4 and 6 to one another, extends between the first end portion 4 and the second end portion 6. The connecting piece 8 can have a circular cross-section and can be connected to end portions 4 and 6 of any shape. The first end portion 4 has a first contact face 10, in which a rectangular cutout 12 is arranged. The cutout is surrounded by a peripheral border 14 which does not have any gaps. A second contact face 16 adjoins the first contact face 10 and is at an angle thereto. It should be noted here that the two contact faces 10 and 16 are each at least largely planar and enclose a bend 18. As can be seen in FIG. 1A, the two contact faces 10 and 16 enclose with one another an angle α which is slightly more than 90°. The two contact faces 10 and 16 thus define between them part of a trapezoidal shape, which is intended to adapt to a trapezoidal, structurally integrated line. The second end portion 6 has a flange connection 20, which in the example shown is a circular flange. This is configured to be connected to a pipe, which likewise has a circular cross-section and a corresponding flange.

The cutout 12 can cover an opening in a lateral surface of a structurally integrated line and thus produce a fluidic connection between the interior of the structurally integrated line and the cross-section of the flange connection 20 through which flow takes place. No modifications to the structurally integrated line are necessary for this purpose, and multiple such structurally integrated lines can be connected together to form a line system. This is shown in the subsequent figures.

Figure 2:
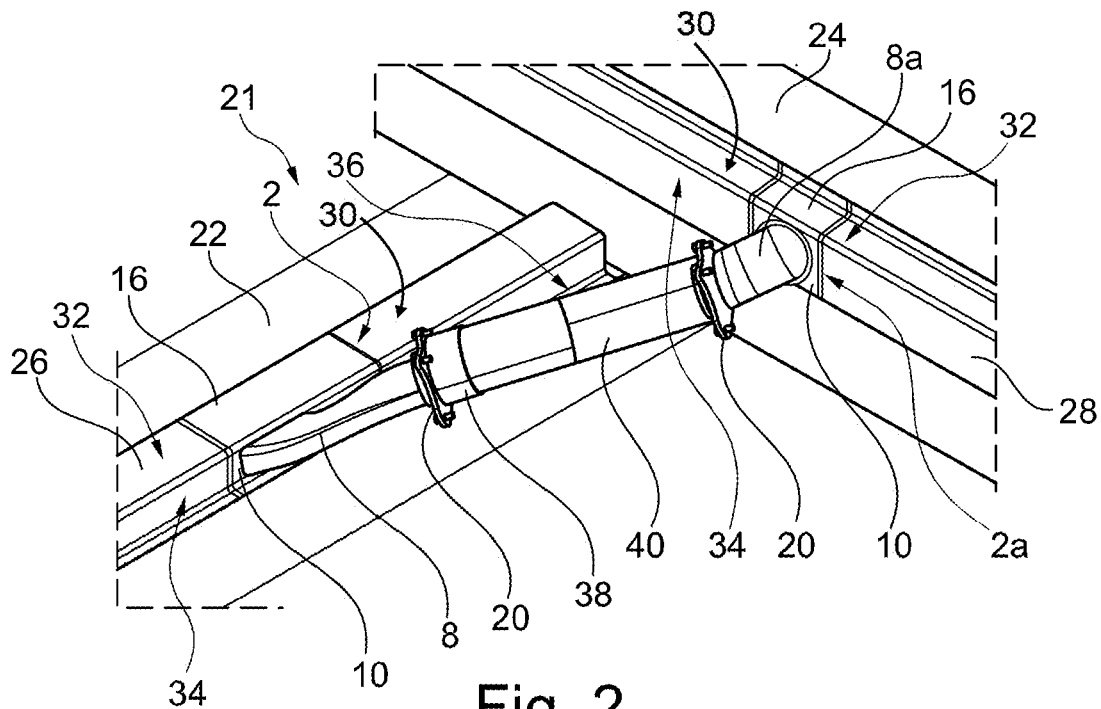
FIG. 2 shows a line system having two connected structurally integrated lines with a partially semi-flexible connection.

FIG. 2 shows a line system 21. A structure having a first structural component 22 and a second structural component 24, into each of which a structurally integrated line 26 or 28 is integrated, is shown here. A connector 2 or 2a is arranged on each of the two lines 26 and 28. To this end, the contact faces 10 and 16 in question are adapted to the lateral surface 30 of the lines 26 and 28, which in the case shown forms a trapezoidal cross-section. The two second contact faces 16 lie flush on an upper side 32 of the lines 26 and 28, while the first contact faces 10 are each connected to a leg surface 34.

A pipe assembly 36, which has a sleeve 38 and a pipe 40 which are mounted relative to one another so as to be displaceable in one another, is formed between the two connectors 2 and 2a. The required tightness of the assembly 36 can be produced by sealing rings between the sleeve 38 and the pipe 40. These can compensate for distance tolerances due to thermal expansion and mechanical loads on the structural components 22 and 24, and for angular deviations.

The connecting piece 8a is thereby designed by way of example with a circular cross-section throughout.

Figure 3:
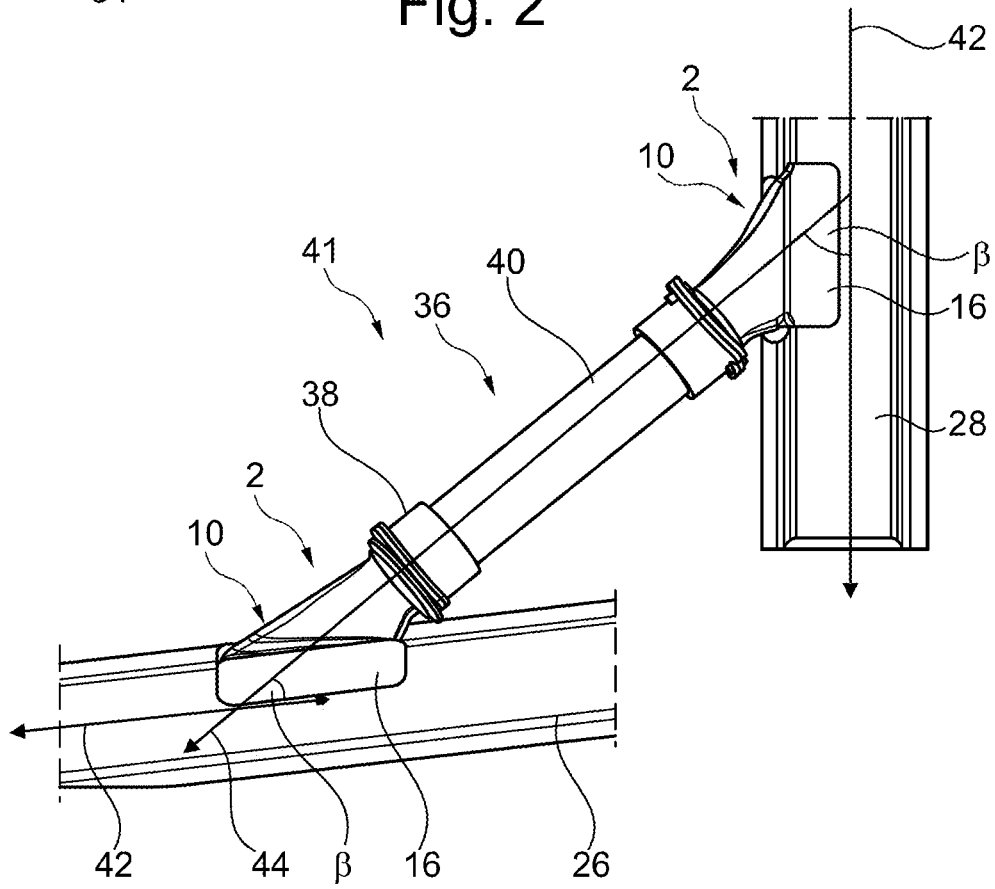
FIG. 3 shows a line system having two connected structurally integrated lines with a floating pipe assembly.

As is shown by a line system 41 in FIG. 3, the direction of extension of the pipe assembly 36 can be adapted to the directions of flow in the lines 26 and 28, so that the flow experiences as smooth a change of direction as possible in the region of the connector 2 and lower pressure losses are thus to be expected. By way of example, a direction of flow 42 of the line 26 or 28 in question and a surface normal 44 of the flange connections 20 enclose an angle of about 45°. By way of example, two identical connectors 2 are here connected to the flow-integrated lines 26 and 28. The pipe assembly 36 is here arranged in a floating manner and comprises, as mentioned hereinbefore, a sleeve 38 and a pipe 40, which are displaceably mounted in one another.

Figure 4:
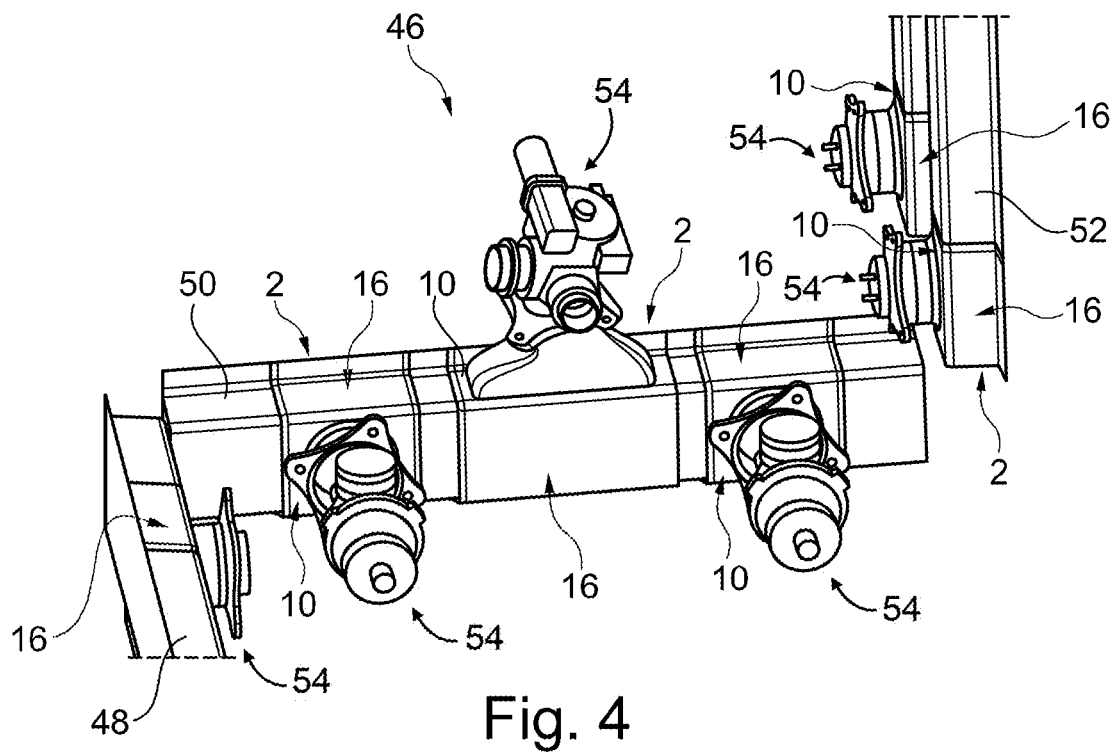
FIG. 4 shows structurally integrated lines with system components arranged thereon.

FIG. 4 shows a line system 46. Three structurally integrated lines 48, 50 and 52 are shown here, each of which is equipped with multiple connectors 2. However, system components 54 are arranged thereon. The system components 54 can include non-return valves, pressure reducing valves, pressure or temperature sensors, float valves or the like.

Figure 5:
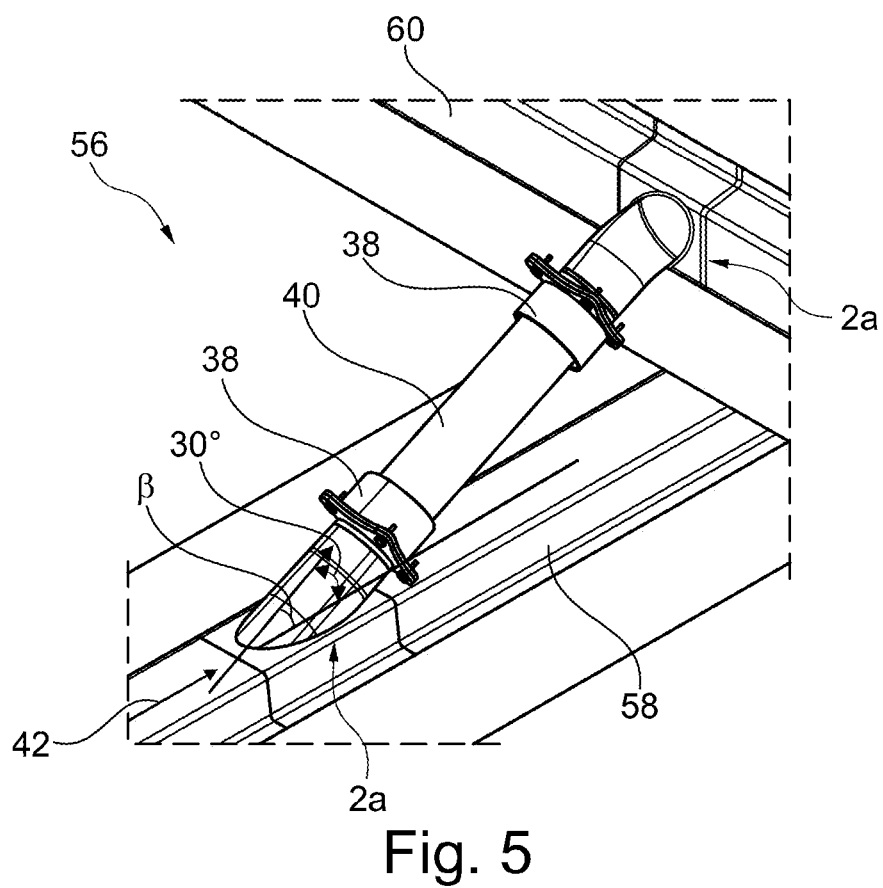
FIGS. 5, 6 and 7 show further line arrangements with different forms of the connectors and/or of the connecting pieces.

FIG. 5 shows a line system 56 in which two structurally integrated lines 58 and 60 are connected to connectors 2a. Both connectors 2a have a connecting piece 8 with a circular cross-section. Between the two connectors 2a there is arranged a pipe 40, which on both sides is displaceably arranged in a sleeve 38. In this example, the connecting piece 8 of the connector 2a on the left in the plane of the drawing is arranged at an angle β of 30° to the direction of flow 42 in the structurally integrated line 58. The connector 2a could have an oval cutout 12 there in this example. The connector 2a on the right in the plane of the drawing has a connecting piece 8 which, however, extends perpendicularly to the direction of extension of the structurally integrated line 60, or to the direction of flow given thereby. The cutout 12 of the connector 2a could there have a circular cutout 12. The two connectors 2a are coupled with the upper side 32 of the structurally integrated lines 58 and 60.

Figure 6:
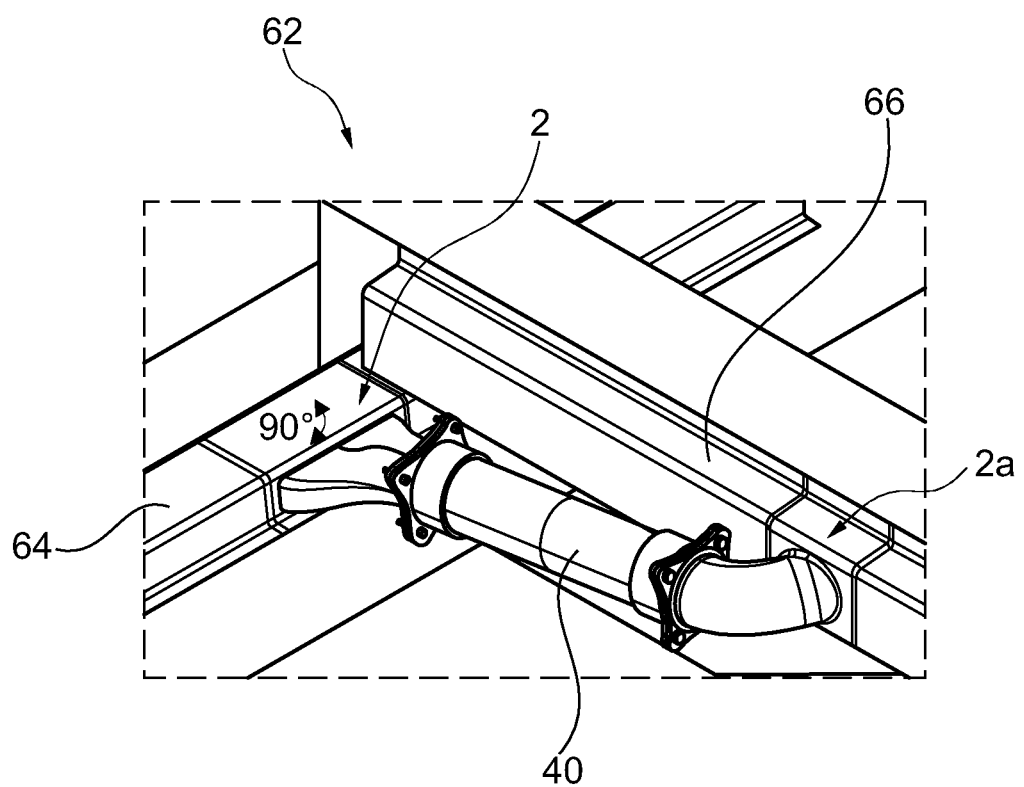

FIG. 6 shows a line system 62 having two structurally integrated lines 64 and 66. Connectors 2 and 2a, which are each connected to a sleeve 38 and between which a pipe 40 is displaceably arranged, are arranged here. The connector 2 is fluidically connected to the structurally integrated line 64 at a leg surface 34 and has a connecting piece 8 which transitions from a largely rectangular cross-section into a circular cross-section. The connector 2a is fluidically connected to an upper side 32 of the structurally integrated line 66 and has a connecting piece 8 which has a circular cross-section throughout. The two connectors are arranged perpendicularly to the respective direction of flow.

Figure 7:
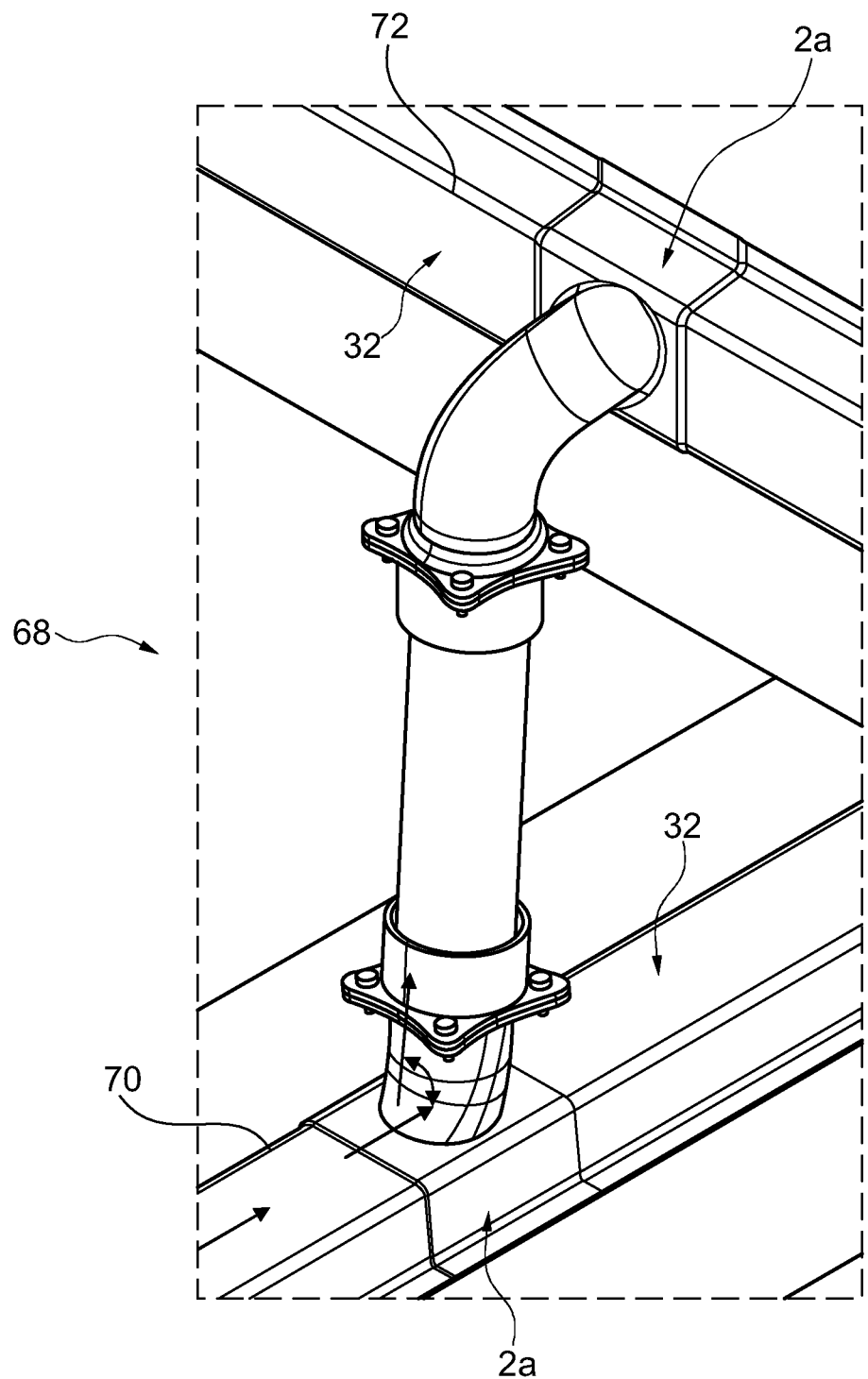

FIG. 7 shows a line system 68 having two structurally integrated lines 70 and 72 and two connectors 2a connected thereto. The two connectors are connected to a sleeve 38, between which sleeves a pipe 40 is mounted in a floating manner. The two connectors 2a are seated perpendicularly on an upper side 32 of the respective structurally integrated line 70 or 72 and have a connecting piece 8 with a circular cross-section.

Figure 8:
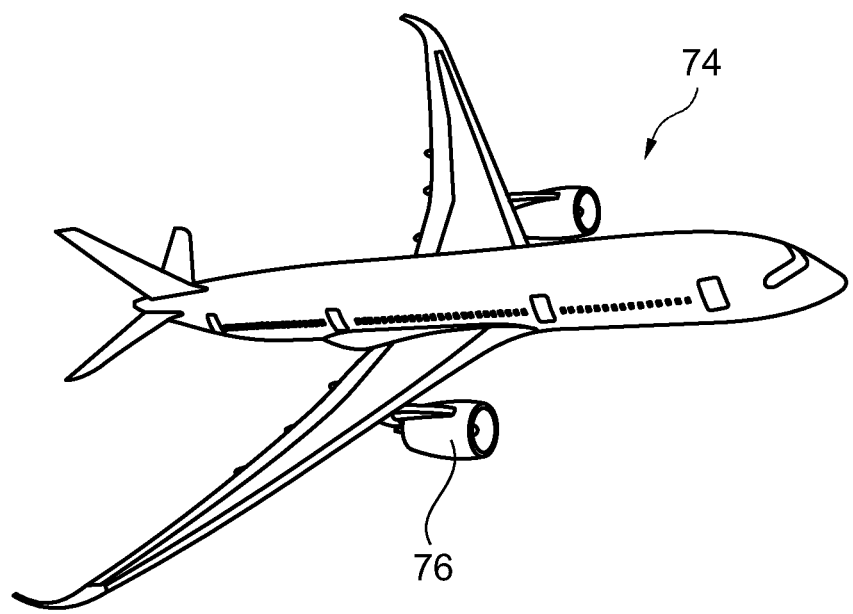
FIG. 8 shows an aircraft with a line system integrated therein.

Finally, FIG. 8 shows an aircraft 74 which has at least one line system 21, 41, 46, 56, 62 or 68. By way of example, a structurally integrated line contained therein could be connected to an engine 76 and receive bleed air therefrom.

In addition, it is pointed out that "having" does not exclude other elements or steps, and "a" or "one" does not exclude a plurality. Furthermore, it is pointed out that features which have been described with reference to one of the above example embodiments can also be used in combination with other features of other example embodiments described above. Reference signs in the claims are not to be regarded as limiting.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS 2 connector
2a connector
4 first end portion
6 second end portion
8 connecting piece
   10 first contact face
   12 cutout
   14 border
   16 second contact face
   18 bend
   20 flange connection
   21 line system
   22 first structural component
   24 second structural component
   26 structurally integrated line
   28 structurally integrated line
   30 lateral surface
   32 upper side
   34 leg surface
   36 pipe assembly
   38 sleeve
   40 pipe
   41 line system
   42 direction of flow
   44 surface normal
   46 line system
   48 structurally integrated line
   50 structurally integrated line
   52 structurally integrated line
   54 system component
   56 line system
   58 structurally integrated line
   60 structurally integrated line
   62 line system
   64 structurally integrated line
   66 structurally integrated line
   68 line system
   70 structurally integrated line
   72 structurally integrated line
   74 aircraft
   76 engine
   20
α angle
β angle

The invention claimed is:

1. A connector for a structurally integrated line system of a vehicle, the connector comprising:
   a first end portion;
   a second end portion;
   a connecting piece; and
   an assembly comprising a sleeve and a pipe, wherein the sleeve and the pipe are inserted into one another to be longitudinally displaceable;
   wherein the connecting piece extends between the first end portion and the second end portion;
   wherein the first end portion has at least two planar contact faces for flush arrangement on a lateral outer boundary surface of a structurally integrated line;
   wherein at least one of the at least two contact faces has a cutout, which is surrounded by a closed border; and
   wherein the second end portion has a flange connection configured for connection to a pipe;
   wherein the first end portion has a first contact face, in which the cutout is arranged;
   wherein the first end portion has a second contact face, which protrudes at an angle to the first contact face;
   wherein the first contact face is configured such that, when the connector is mounted onto the structurally integrated line, the closed border surrounding the cutout lies flush against the lateral outer boundary surface without any gaps and covers an opening in the lateral outer boundary surface;
   wherein the first end portion is configured such that the first end portion can be placed on an edge of the lateral outer boundary surface of the structurally integrated line at any position along a length of the structurally integrated line; and
   wherein the assembly is connected to the second end portion.

2. The connector according to claim 1, wherein the second contact face is free of a cutout.

3. The connector according to claim 1, wherein the cutout is rectangular.

4. The connector according to claim 1, wherein the first end portion has multiple contact faces, which form a trapezoidal cross-section.

5. The connector according to claim 1, wherein the connecting piece adjoins the cutout at an angle to a plane spanned by the cutout.

6. The connector according to claim 1, wherein the flange connection has a circular flange.

7. A structurally integrated line system, comprising:
   at least one structural component with at least one line integrated therein; and
   at least one connector according to claim 1;
   wherein the at least one line has an opening, on which the connector is arranged, so that the cutout covers the opening.

8. The structurally integrated line system according to claim 7, comprising:
   at least two structurally integrated lines, which are each connected to a connector;
   wherein the at least one connector is a plurality of connectors; and
   wherein an assembly having a sleeve and a pipe, which are inserted into one another to be longitudinally displaceable, extends between two connectors of the plurality of connectors.

9. A vehicle having multiple structural components, wherein at least one structural component has at least one structurally integrated line which is connected to the connector according to claim 1.

10. The vehicle according to claim 9, wherein:
the at least one structurally integrated line has multiple structurally integrated lines, which form a line system;
the line system comprises at least one structural component with at least one line integrated therein and at least one connector; and
the at least one connector comprises a first end portion, a second end portion and a connecting piece extending between the first end portion and the second end portion, wherein the first end portion has at least one contact face for arrangement on a structurally integrated line, wherein at least one of the at least one contact face has a cutout which is surrounded by a closed border, wherein the second end portion has a flange connection for connection to a pipe; and
wherein the at least one structurally integrated line has an opening, on which the connector is arranged, so that the cutout covers the opening.

11. The vehicle according to claim 9, comprising:
at least one system component configured to interact with a fluid flowing in the at least one structurally integrated line;
wherein the at least one system component is connected directly to the flange connection.

12. The vehicle according to claim 9, wherein:
the vehicle is an aircraft; and
the at least one structurally integrated line is connected to an air source.

13. A structurally integrated line system, comprising:
at least one structural component with at least two structurally integrated lines integrated therein; and
a plurality of connectors, each of which comprises:
a first end portion;
a second end portion; and
a connecting piece;
wherein the connecting piece extends between the first end portion and the second end portion;
wherein the first end portion has at least two planar contact faces for flush arrangement on a lateral outer boundary surface of a structurally integrated line;
wherein at least one of the at least two contact faces has a cutout, which is surrounded by a closed border; and
wherein the second end portion has a flange connection configured for connection to a pipe;
wherein the first end portion has a first contact face, in which the cutout is arranged;
wherein the first end portion has a second contact face, which protrudes at an angle to the first contact face;
wherein the first contact face is configured such that, when the connector is mounted onto the structurally integrated line, the closed border surrounding the cutout lies flush against the lateral outer boundary surface without any gaps and covers an opening in the lateral outer boundary surface; and
wherein the first end portion is configured such that the first end portion can be placed on an edge of the lateral outer boundary surface of the structurally integrated line at any position along a length of the structurally integrated line;
wherein the at least one line has an opening, on which the connector is arranged, so that the cutout covers the opening;
wherein the at least two structurally integrated lines are each connected to a connector; and
wherein an assembly having a sleeve and a pipe, which are inserted into one another to be longitudinally displaceable, extends between two connectors of the plurality of connectors.

* * * * *